US006249716B1

(12) United States Patent
Edens et al.

(10) Patent No.: US 6,249,716 B1
(45) Date of Patent: Jun. 19, 2001

(54) PRINTING AND FINISHING DOCUMENTS

(75) Inventors: B. K. Edens, Drachten; G. Hidding, Heerenveen; J. Luinge, Oosterwolde, all of (NL)

(73) Assignee: Hadewe B.V., Drachten (NL)

( * ) Notice: Subject to any disclaimer, the term of this patent is extended or adjusted under 35 U.S.C. 154(b) by 0 days.

(21) Appl. No.: 09/200,732

(22) Filed: Nov. 27, 1998

(30) Foreign Application Priority Data

Nov. 27, 1997 (NL) .................................................. 1007637

(51) Int. Cl.[7] ........................................................ G06F 7/00

(52) U.S. Cl. ....................... 700/222; 700/220; 270/52.02; 270/52.06; 270/58.03

(58) Field of Search .................................... 700/213, 219, 700/220, 221, 222; 270/52.02, 52.03, 52.06, 58.03, 1.02

(56) References Cited

U.S. PATENT DOCUMENTS 4,639,873 * 1/1987 Baggarly et al. .................... 364/466
4,800,505 1/1989 Axelrod et al. .
4,817,042 * 3/1989 Pinstov ................................ 364/478
5,283,752 2/1994 Gombault et al. .
5,321,624 * 6/1994 Helffrich et al. .................... 364/478
5,655,759 * 8/1997 Perkins et al. .................... 270/52.02
5,745,590 * 4/1998 Pollard ................................ 382/101
6,030,132 * 2/2000 Harman et al. ........................ 400/62

FOREIGN PATENT DOCUMENTS 29 40 771 4/1981 (DE) .
0 098 742 1/1984 (EP) .
0 406 976 1/1991 (EP) .
0 642 943 3/1995 (EP) .
0 719 597 7/1996 (EP) .
0 754 500 1/1997 (EP) .
2 208 021 2/1989 (GB) .

* cited by examiner

*Primary Examiner*—Christopher P. Ellis
*Assistant Examiner*—Khoi H. Tran
(74) *Attorney, Agent, or Firm*—Burns, Doane, Swecker & Mathis, L.L.P.

(57) ABSTRACT

A printer (2; 52) prints documents which, after arriving in a finishing system (1; 51), are detected and finished in an order corresponding with the order in which the documents have been printed by the printer (2; 52). The printer (2; 52) generates verification markings following one of the documents and prior to a next one of the documents. The number of documents that arrive in an interval limited by at least one of the verification markings are counted and compared with a reference number. An error message is generated if the counted number of arrived documents does not agree with the reference number. This makes it possible to monitor whether, after the documents have been printed, any faults have occurred. Further, a system for finishing documents is described.

19 Claims, 3 Drawing Sheets

PRINTING AND FINISHING DOCUMENTS

This application claims priority under 35 U.S.C. §§119 and/or 365 to 1007637 filed in The Netherlands on Nov. 27, 1997; the entire content of which is hereby incorporated by reference.

FIELD AND BACKGROUND OF THE INVENTION

This invention relates to a method for printing and finishing documents, and to a system for finishing printed documents.

Such a method and such a system are known from U.S. Pat. No. 5,283,752. This patent specification discloses a method and a system in which the printing of signs that represent finishing instructions, or refer to them, on the documents is rendered entirely superfluous in that the finishing instructions are stored in a memory of a control system and are executed when the document to which they relate has—under the control of the control system—reached the position where the finishing instructions are to be executed. However, this imposes relatively stringent requirements on the reliability of the transport of the documents after printing.

U.S. Pat. No. 4,800,505 discloses a method and an apparatus in which finishing instructions associated with individual documents are stored in relation to identification codes. On the documents in question, identification signs are printed which represent the corresponding identification codes. During the finishing of documents in the finishing system (in this case, an inserter system), the signs are read from the documents and the documents are finished in accordance with the finishing instructions stored in relation to the identification codes as read.

An advantage of finishing the documents in accordance with signs printed thereon that represent finishing instructions or, as according to U.S. Pat. No. 4,800,505, refer to them, is that a robust process is obtained that is not easily disturbed if irregularities occur between the printing and the finishing of the documents. It is objectionable, however, that signs are printed on the documents that are not of interest to the human reader or observer of the document and disturb the appearance of the document. In particular, this imposes limitations on the lay-out of the document, because the area where the signs are to be provided must be kept free from other prints.

SUMMARY OF THE INVENTION

The object of the invention is to obviate the above-mentioned drawbacks in the sense that, on the one hand, it is made possible to dispense entirely with the provision of prints on the documents, that are to be read by the finishing system, while, on the other hand, it is still made possible to monitor at least the stream of printed documents to be finished.

According to the present invention, this object is realized by providing a method for printing and finishing documents wherein a number of documents are printed in a particular order by means of a printer, the printed documents are transported to a finishing system, the arrival of the documents in at least one position in the finishing system is detected, finishing operations are performed on the arrived documents in the finishing system, and the printed documents are finished in an order corresponding with the order in which the documents have been printed by the printer, and wherein the printer repeatedly generates a verification marking following one of the documents and prior to a next one of the documents, while transporting the documents to the finishing system, an ordering of the documents and the verification markings between successive ones of those documents is maintained, which ordering corresponds with the order in which the printer's feeding the documents and generating the verification markings has been carried out, the arrival of each of the verification markings in at least one position in the finishing system is detected, the documents whose arrival has been detected in an interval limited by at least one of the verification markings are counted, the counted number of the arrived documents is compared with a reference number of the arrived documents, and an error message is generated if the counted number of the arrived documents does not agree with the reference number.

A further embodiment of the invention is formed by a system for finishing printed documents, comprising a detector structure for detecting documents which have arrived at a particular position, control means and a feed inlet for feeding documents to be finished, and at least one finishing assembly connected with the feed inlet, wherein the detector structure is coupled to the control means, the detector structure and the control means being arranged for recognizing verification markings, for counting detected arrived documents in an interval limited by at least the detection of one of the verification markings, for comparing counted numbers of arrived documents with reference numbers of arrived documents and for generating an error message if the counted number of arrived documents does not agree with the reference number. Such a system is specifically suitable for finishing documents, which may be printed by a conventional printer, according to the method of the invention.

The invention makes it possible to monitor whether after the printing of the documents, any faults have occurred, such as the jamming of a document, a document getting lost, an overlap arising between successive documents, or the separation of documents delivered by a printer as a double sheet. When a discrepancy between a counted number and an associated reference number has been detected, for instance the operator of the finishing system is warned by the error message. Preferably, the finishing system is moreover stopped automatically.

What is obtained as a result of verification markings being provided at predetermined moments is, if the process proceeds in the intended manner, an order of documents in which markings have been included at predetermined points. If at a more downstream point this order proves not to be present anymore; that is an indication that a fault has occurred during the transport or processing of documents and markings.

All this makes it possible, with sufficient reliability, to print a batch of documents and to finish this batch, optionally at a later time. A stock of documents, after printing has been completed, is then transferred in its entirety to a finishing system, such as an inserter system or a binding system.

However, also when the documents are printed and finished in-line, that is, are serially transferred, after being printed, to the inserter system, it is advantageous that the progress of the documents after printing can be monitored without requiring the documents themselves to be provided with signs especially intended for that purpose.

It is noted that the printing of documents may consist inter alia in providing the complete printing of the document or solely in adding particular signs to a preprinted sheet. A document may consist of a single sheet or of a set of sheets, which may or may not be bound to each other.

Further objects, features, advantages and details of the present invention are described hereinafter with reference to the drawing.

DETAILED DESCRIPTION

Figure 1:
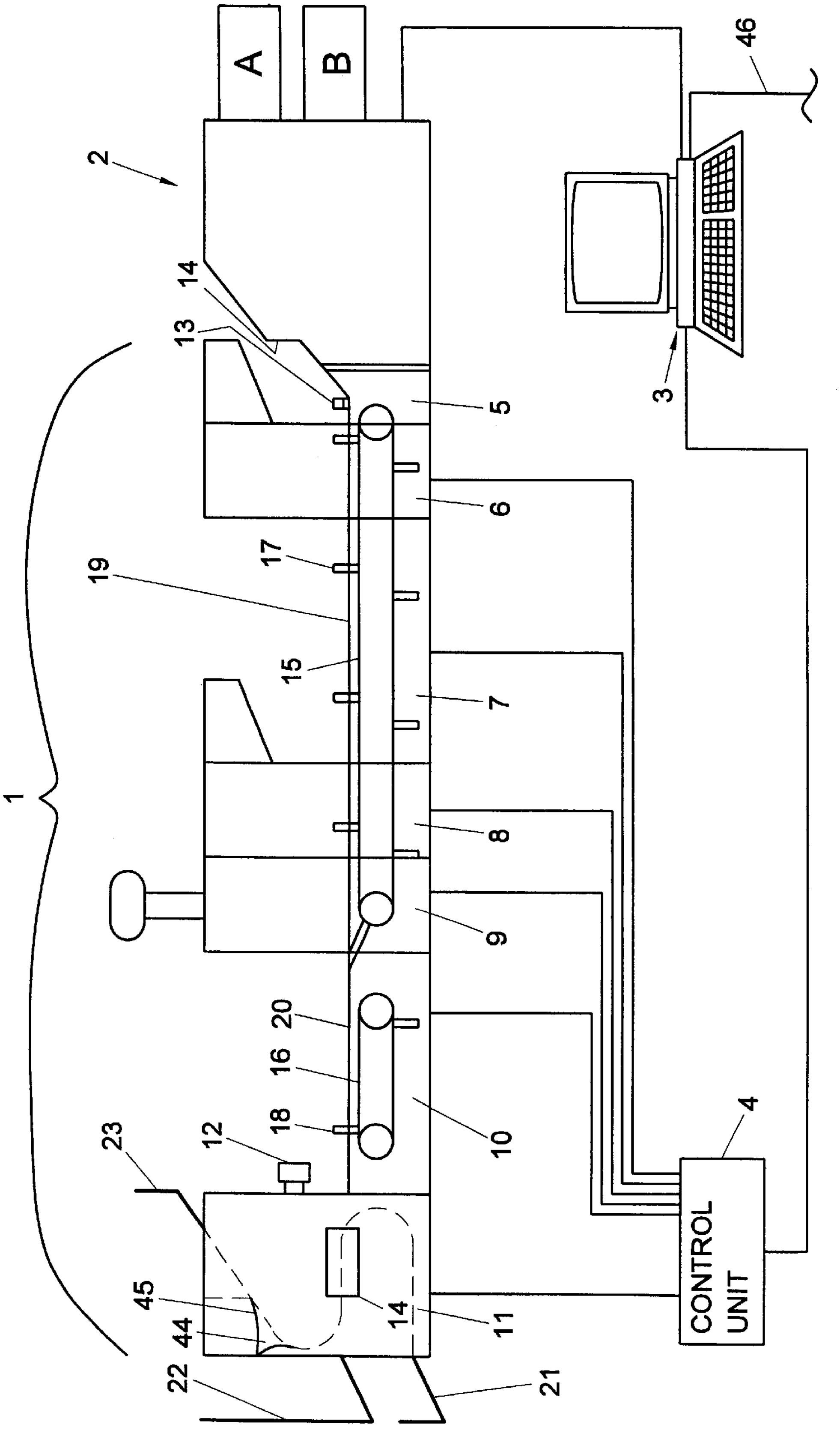
FIG. 1 is a schematic representation of a first example of a system according to the invention.

The exemplary arrangement represented in FIG. 1 comprises a finishing system in the form of an inserter system 1 and a printer 2 which can be of a commercially available conventional type. According to the example shown, both the inserter system 1 and the printer 2 are connected to a computer 3, in which data regarding the information to be printed on the documents and regarding the associated finishing data are stored. These data are preferably generated utilizing a separate computer system, which can be of a type known per se, and are converted in the computer 3 to adapted instructions for the printer 2 and for the inserter system 1. For the purpose of communication with sources where data for, for instance, a mailing are generated, the computer 3 is incorporated as a printing and inserting server in a network 46.

The inserter system 1 is built up from a control unit 4 and, coupled thereto, a first insert feeding station 6 (also referred to as insert feeder) for feeding inserts, a transport track 7, a second insert feeding station 8, a folding station 9, a collecting and transport station 10 and an inserter station 11. The transport track 7 extends through the insert feeding stations 6 and 8 and the folding station 9. The upstream end 5 of the transport track 7 forms a feed inlet 5 for feeding documents to be inserted to the inserter system 1 and to the inserter station 11. According to this example, the feed inlet 5 is arranged for receiving one-by-one documents and verification sheets fed by the printer 2.

The second insert feeding station 8 is arranged for selectively feeding inserts directly, either to the folding station 9 or to the transport track 7, which runs under the folding station 9. Such an arrangement and design of an insert feeding station 8 and such a collecting and transport station 10 are described in more detail in U.S. Pat. No. 5,561,963.

The inserter station 11 comprises a detector 12 for detecting the arrival of fed sets of sheets. The upstream end 5 of the transport track 7 includes a detector 13 for detecting individual sheets which, coming from the printer 2, reach the inserter system 1.

According to the present example, the computer 3 and the control unit 4 together form the control means for controlling the inserter system 1. It is also possible, however, to design the control means differently. For instance, the inserter system 1 may be controllable by a control unit of its own, which may, for instance, be formed by an associated standard computer, which controls the various functions of the inserter system via a suitable interface, or by a special, built-in control unit.

The inserter station 11 includes an inserting position 14, which is connected with the feed inlet 5 by the transport track 7 and the collecting and transport station 10.

The detectors 12, 13 are located between the feed inlet 5 and the inserting position 14, so that they can detect and signal the arrival of a set of sheets, or a sheet, at two points in the system. It is noted that detectors conventionally arranged in the stations 6, 8, 9, 10, 11 or on the transport track 7 (not shown) can also be used, in addition to the detectors 12, 13, or instead of the detectors 12, 13. Then, for instance, the start of a finishing operation which is performed in response to the arrival of a sheet or set of sheets can be used as an indication that a sheet or a set of sheets has reached the station in question. This provides the advantage that no separate detectors for detecting the arrival of a sheet or a set of sheets need to be arranged in the positions in question.

The detectors 12, 13 are arranged for detecting verification sheets and for feeding, in response thereto, associated verification signals to the control unit 4. In operation, the detectors 12, 13 additionally signal the arrival of sets of sheets for the inserter station 11, and the arrival of individual sheets from the printer 2 at the feed inlet 5, respectively.

The control unit 4 is arranged for counting arrival messages issuing from the detectors 12, 13 until a verification signal coming from the detector in question has been received or until a series of documents has been completed. Further, the control unit 4 is arranged for comparing counted numbers of arrived documents or sets of documents with reference numbers derived from computer-stored data regarding the printing and finishing of documents and for generating an error message if the counted number of arrived documents or sets of documents and the corresponding reference number do not match.

The printer 2 comprises two sheet trays A and B and an outlet 14 for delivering sheets to the feed inlet 5 of the inserter system 1. The transport track 7 and the collecting and transport station 10 comprise endless conveyor belts 15, 16 which are provided with transport fingers 17, 18 that serve for receiving and advancing documents and inserts on guiding surfaces 19, 20 of the transport track 7 and the collecting and transport station 10. The inserter station 11 includes an envelope hopper 21 for receiving a stock of envelopes and feeding one-by-one envelopes to be filled, a collecting receptacle 22 for receiving filled envelopes, and a discharge receptacle 23 for receiving items not to be mailed, among which verification sheets In the inserter station 11, downstream of the detectors 12, 13, a switch 44 is located, to which is connected a branch 45 which, in turn, leads to the deposit position 23. The control system 4 is arranged for operating the switch 44 for diverting documents in response to a verification signal coming from the detector 13. Thus, the verification sheets can be diverted to the deposit position 23. Accordingly, these do not need to be separated from the items destined for addressees, and can, if desired, be simply used again, at least if they are not to be printed again at the same position.

However, instead of diverting verification sheets unfinished, it is also possible to finish the verification sheets.

If the verification sheets have, for instance, indications printed on them that identify a source responsible for the documents as well as the printed and finished documents, and, after being finished, are sent to that source, a confirmation or acknowledgment that an instruction has been processed by, for instance, a mailroom, can be obtained in a simple manner.

A particularly effective communication of acknowledgments is obtained if the indications provided on the verification sheets are detected and are converted into electronic form, while, after a set of documents has been finished without an error being signaled, a message by electronic mail corresponding to indications on the verification sheet is sent to the source that originated the instruction to print and finish the documents.

Figure 2:
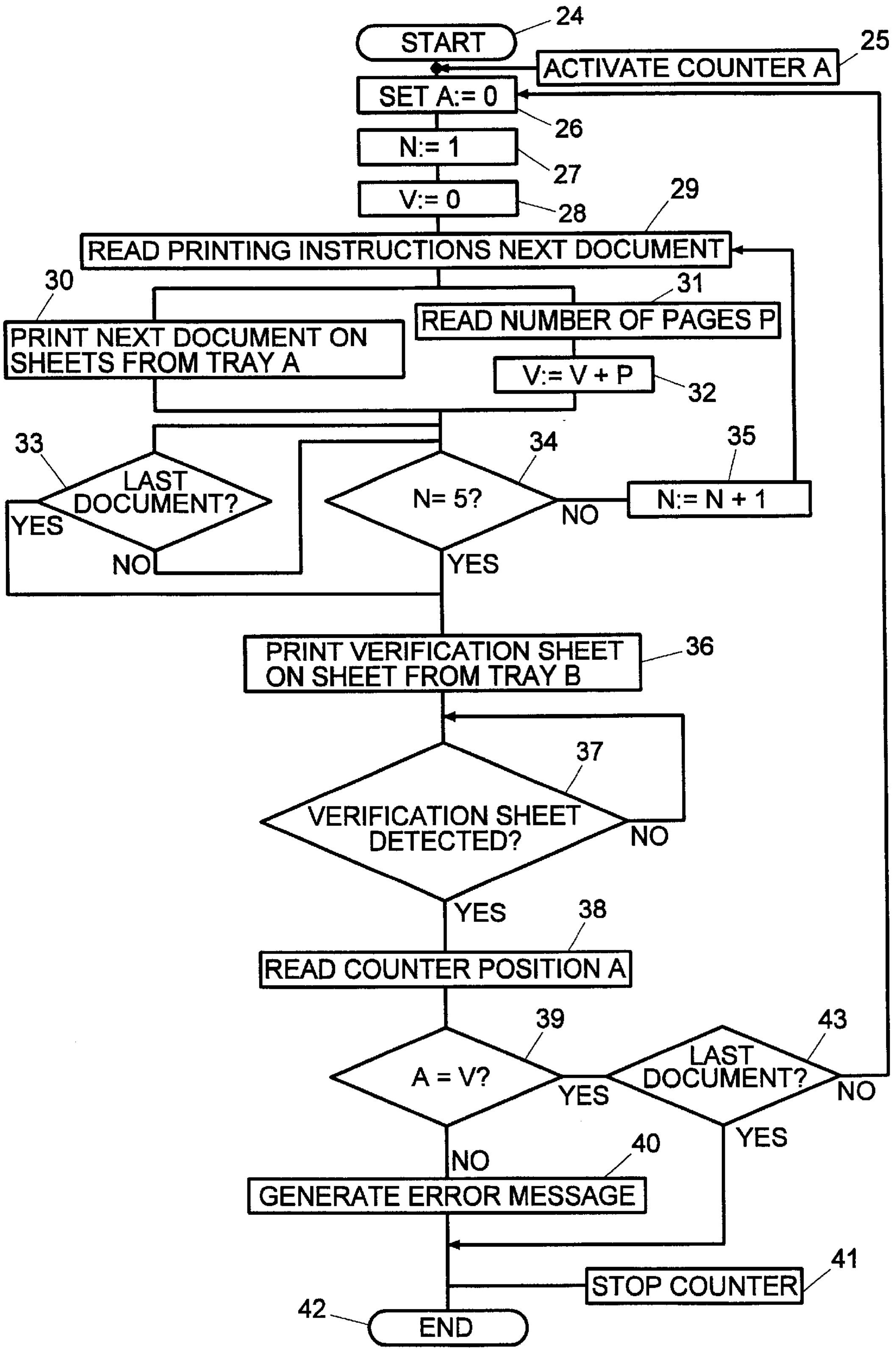
FIG. 2 is a flow diagram of an example of an algorithm for carrying out a method according to the invention.

Finishing documents with the configuration of equipment shown in FIG. 1 can be performed as described hereinafter with reference to the algorithm represented in FIG. 2.

The method can be started as is represented by the start field 24. First of all, a separate software counter 25 is activated, which counts the number of document sheets detected by the detector 13. Next, a counter variable 'a' for counting arrived document sheets at the upstream end 5 of the transport track 7 is set at zero, as is represented by step 26. This counter is designed as a separate counter, designed as software. The counter can also be designed as a piece of hardware. Then, as step 27, a variable 'n', which indicates a serial number of the document being processed, is set at 1. A variable 'v', which indicates the intended number of sheets, is likewise set at zero, as is represented by step 28.

After this begins the actual method of printing documents and finishing the documents to form items to be mailed. First of all, data that are stored in the computer 3, or at least in an information carrier contained therein, are read to determine the printing instructions for a next document, as is represented by step 29. The document is conventionally printed on the basis of those printing instructions, as is represented by step 30. Further, independently of the printing of the document, on the basis of the printing instructions, the value of the variable 'p' is determined, which indicates the number of sheets of which the document will consist (step 31). Thereupon the variable 'v' (which, prior to the printing of the first document, is still equal to the initialization value zero) is increased by the current value of the variable 'p', as is represented by step 32. When this step 32 and the control of the printing of the document have been completed, the algorithm proceeds to the following control steps.

First, it is established if any next document is to be printed, as is represented by step 33. If this is not the case, the algorithm proceeds to a verification cycle, which is discussed hereinafter. If, on the other hand, a next document is to be printed, it is established, as step 34, whether the variable 'n' has reached the value five. The limiting value 'five' means that each time five documents have been printed, transport and finishing are verified. Of course, a different value than five can be selected, weighing production speed against ensuring that the proper documents will be mailed, and depending on the time verification takes. Immediately after the control of the printing of the first document, the value of the variable 'n' is still '1', of course, so that no switch to a verification cycle is made yet. Now, the variable 'n' is increased by the number one (step 35) and then the steps 29–33 are repeated for the second document. This printing control and registration cycle is repeated until the printing of the fifth document has been controlled and the page number 'p' has been added to the value of the variable 'v'. The selection step 34 then results in the outcome 'yes'.

Thereupon, the verification cycle is started with the printing of a verification sheet (or a verification card or any other object that can be transported along with the documents), which is represented as step 36, followed by waiting until the verification sheet has been delivered by the printer and has reached the detector (step 37). Optionally, in the meantime, a start can be made with controlling the printing of a next document, but this has not been done here for the sake of simplicity.

When the verification sheet has reached the detector 13, the counter position 'a' is read, which indicates the number of arrived documents (exclusive of the verification sheet) (step 38). Then the value of 'a' is compared with the applicable value of 'v', which indicates how many documents sheet should have arrived at the detector 13 (step 39).

If these values are not identical, an error message is generated (step 40), the counter is stopped (step 41) and the printing and verification status is abandoned (step 42) and a job recovery status, not further described here, is entered.

If, on the other hand, the values 'a' and 'v' are identical, it is established again whether the last document has been reached (step 43). If this is the case, the printing and verification status is likewise abandoned. If still more documents are to be printed, the control of the printing and the registration of the page number for a next group of five documents are started with step 26.

It is noted that it is also possible, for instance, to count whether the number of document sets that have been fed to the inserter station 11 is the same as the number of document sets in respect of which printing has been controlled.

Given that in the method describe above, the verification sheets are also printed, there is a possibility of using the information which has been imparted to the verification sheets in the form of the print, within the context of the verification, for instance by printing signs that indicate the reference number of documents. By detecting these prints in the finishing system 1, for instance the reference number of pages can then be read. This makes it possible to pass the verification data on to the finishing system, without requiring the actual presence of a communication link between the computer and the verification system. For processing sets of printed documents in groups, too, it is advantageous if the verification information is contained in the batch of documents. It is also possible to read the print in the finishing system 1 to recognize that a sheet is a verification sheet. In that case, the verification sheets can be fed from the same tray as sheets intended for the documents intended for addressees.

To recognize the verification sheets, for instance a pattern printed thereon may be unique to verification sheets. It is also possible, however, to provide the verification sheets with a print which is different in kind from each of the documents that are printed and finished. The print can, for instance, be designed in a different color or in a magnetic ink. Embossing and punching techniques may also be used to make the distinction between documents and verification sheets readily recognizable Further, it is possible to provide the verification sheets with, or to make them of, a different material with optical, mechanical and/or electrical or electromagnetic properties differing from those of the documents. Thus, for instance, the verification sheets can be made of transparent material, be provided with a corrugated structure or be provided with active or passive transponders or other markings that are known, for instance in the field of theft prevention systems in stores. Such solutions are especially attractive if the verification sheets, after use, are collected for reuse.

A particularly simple way of making the verification sheets recognizable is to provide them with a print at predetermined points, at which points the documents that are to be printed and finished are not provided with a print. To be considered here are, for instance, prints on the back of the verification sheets.

A further possibility offered by providing a print on the verification sheets is to provide indications regarding finishing instructions for at least one next document. One or more following documents can then be finished in accordance with the indications as provided, without requiring direct communication between the computer 3 and the finishing system. This, too, provides the advantage that thus series of unique documents can be printed and finished in groups.

Further, prints on the verification sheets can contain indications regarding the further processing of at least one preceding or following document after finishing. To be considered here are, for instance, specifications regarding destinations or types of packages of the finished documents. These indications may apply both to preceding and to following documents.

In the foregoing description, verification sheets have been used as verification markings. It is also possible, however, to obtain the verification markings by creating, when printing, an increased interval between two successive ones of the documents, which interval is greater than a defined maximum interval. This manner of providing verification markings provides the advantage that no sheets or the like need to be supplied and is suitable especially in combination with the direct one-by-one transport, after printing, of printed documents from the printer to the finishing system. It is also possible, however, to use verification markings in the form of an increased feeding interval in combination with the transfer in groups of printed documents to the finishing system. In that case, verification markings in a stack of printed documents can be obtained, for instance, by providing an offset in the stack in response to an increased feeding interval.

Figure 3:
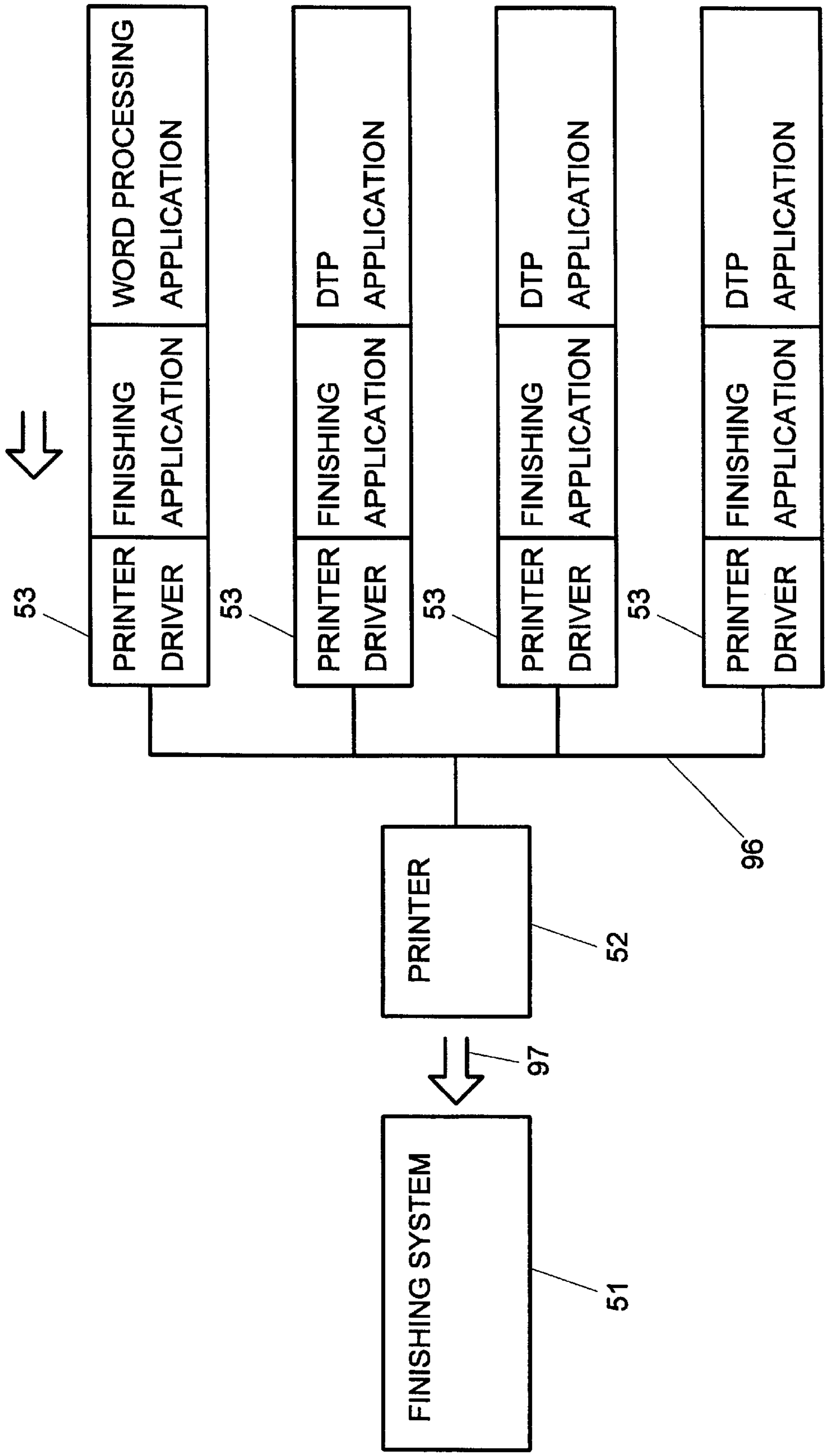
FIG. 3 is a schematic representation of a second example of a system according to the invention.

The system shown in FIG. 3 consists of a finishing system in the form of an inserter system 51. For the printing of main documents, a printer 52 is provided, which may be of any type known per se. The printer is included in a network 96, to which are connected computers 53, four in the present example. These computers are not connected with the finishing system, but on each of these computers a finishing application is installed which is tailored to the verification specifications of the finishing system. Further, on one of the computers 53, a word processing package is installed and on the other three a desktop publishing package is installed. If it is desired to print and finish documents for which the printing instructions have been generated by means of the word processing package or the desktop publishing package, the data defining the documents to be printed are first converted to data further containing instructions for printing verification sheets. Information regarding the moments at which the verification sheets are printed can be fixedly stored in the finishing system 51, so that it is known beforehand when, if the printer 52 and the finishing system 51 operate without fault, a verification sheet is to be expected, for instance after every ten document sheets. It is also possible that it is mentioned on the verification sheets themselves how many document sheets and/or document sets have preceded them. These data are then read by the finishing system.

If the comparison of the fixed or the specified reference number of arrived document sheets or document sets and the counted number shows that a discrepancy has arisen, the finishing system produces an alarm signal.

The transfer of documents and verification sheets from the printer 52 to the finishing system 51 (arrow 97) can, here too, occur both serially and in groups. For that matter, to enhance the user-friendliness of the finishing application, it is preferably integrated with the printer driver to form a printing and finishing driver.

It will be clear to those skilled in that art that the invention is not limited to the embodiments described hereinbefore by way of example, but that the proposed invention can be carried out in many other ways.

We claim:

1. A method for printing and finishing documents, comprising:

printing a number of documents in a particular order by means of a printer;

transporting the printed documents to a finishing system;

detecting the arrival of the documents in at least one position in the finishing system;

performing finishing operations on the arrived documents in the finishing system, with the printed documents being finished in an order corresponding with the order in which the documents have been printed by the printer;

the printer repeatedly generating a verification marking following one of said documents and prior to a next one of said documents;

maintaining, while transporting the documents to the finishing system, an ordering of said documents and said verification markings between successive ones of those documents, which ordering corresponds with the order in which the printer's feeding said documents and generating the verification markings has been carried out;

detecting the arrival of each of the verification markings in at least one position in the finishing system;

counting the documents whose arrival has been detected in an interval limited by at least one of said verification markings;

comparing the counted number of said arrived documents with a reference number of said arrived documents; and generating an error message if the counted number of said arrived documents does not agree with said reference number.

2. A method according to claim 1, wherein the verification markings are formed by an interval between two successive ones of the documents, greater than a defined maximum interval.

3. A method according to claim 1, wherein the verification markings are formed by verification sheets.

4. A method according to claim 3, wherein the verification sheets are also printed and at least portions of the prints are detected in the finishing system.

5. A method according to claim 4, wherein the verification sheets are recognized in response to detection of the prints provided thereon.

6. A method according to claim 4, wherein the prints on the verification sheets contain indications regarding the reference numbers of said arrived documents and wherein said indicated numbers are read and are compared with an associated, counted number of said arrived documents.

7. A method according to claim 4, wherein the prints on at least some of the verification sheets contain indications regarding finishing instructions for at least one next document and said at least one next document is finished in accordance with said indications.

8. A method according to claim 4, wherein the prints on the verification sheets contain indications regarding the further processing of at least one preceding or following document after its being finished, and the preceding or following documents are further processed in accordance with said instructions.

9. A method according to claim 1, wherein the successive documents and the verification markings are transported serially from the printer to the finishing system.

10. A method according to claim 1, wherein the successive documents and the verification markings are transferred in groups from the printer to the finishing system.

11. A method according to claim 1, wherein the generation of a verification marking is carried out after completion of the printing of a particular number of documents, and wherein the number of documents are counted by counting a number of finishing operations carried out in response to the detection of the arrival of a document.

12. A method according to claim 3, wherein the verification sheets, upon arrival in the finishing system, are processed differently from said documents.

13. A method according to claim 12, wherein the verification sheets are diverted to a deposit position.

14. A method according to claim 3, wherein the verification sheets are finished.

15. A method according to claim 3, wherein indications are printed on the verification sheets, which identify a source responsible for said documents, as well as printed and finished documents, and the verification sheets, after being finished, are sent to said source.

16. A method according to claim 3, wherein indications are printed on the verification sheets, which identify a source responsible for said documents, as well as printed and finished documents; wherein said indications are detected and converted into electronic form; and wherein, after finishing without error being signaled, a message by electronic mail corresponding to indications on the verification sheet is sent to said source.

17. A method according to claim 3, wherein the verification sheets have been or are provided with a print in different ink than the print on each of the documents that are printed and finished.

18. A method according to claim 3, wherein the verification sheets have been or are provided with, or manufactured from, a different material than each of the documents that are printed and finished.

19. A method according to claim 3, wherein the verification sheets have been or are provided, at predetermined positions, with a print that is different in position than print on each of the documents that are printed and finished.

* * * * *